(12) United States Patent
Cailleteau et al.

(10) Patent No.: US 9,919,800 B2
(45) Date of Patent: Mar. 20, 2018

(54) BED EXTENSION (71) Applicant: Zodiac Seats France, Issoudun (FR)

(72) Inventors: Jeremy Cailleteau, St Aout (FR); Philippe Roy, Bourges (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/761,684

(22) PCT Filed: Jan. 23, 2014

(86) PCT No.: PCT/IB2014/058507
§ 371 (c)(1),
(2) Date: Jul. 17, 2015

(87) PCT Pub. No.: WO2014/115107
PCT Pub. Date: Jul. 31, 2014

(65) Prior Publication Data
US 2015/0360783 A1    Dec. 17, 2015

Related U.S. Application Data

(60) Provisional application No. 61/755,542, filed on Jan. 23, 2013.

(51) Int. Cl.
*B64D 11/06* (2006.01)
*B60N 2/34* (2006.01)
*B64D 11/00* (2006.01)

(52) U.S. Cl.
CPC ......... *B64D 11/0604* (2014.12); *B60N 2/345* (2013.01); *B64D 11/06* (2013.01); *B64D 11/0641* (2014.12); *B64D 2011/0069* (2013.01)

(58) Field of Classification Search
CPC .... B64D 11/0604; B64D 11/641; B60N 2/345
See application file for complete search history.

(56) References Cited

U.S. PATENT DOCUMENTS 7,946,532 B2 *  5/2011  Martin ................. B60N 2/34
                                                    244/118.6
8,011,723 B2 *  9/2011  Park .................... B60N 2/345
                                                    244/118.6
(Continued)

FOREIGN PATENT DOCUMENTS

GB       2510765 A  *  8/2014  ............ B64D 11/06
WO    2007/061381 A1    5/2007
WO    2007/072045 A2    6/2007

OTHER PUBLICATIONS

International Patent Application No. PCT/IB2014/058507, International Search Report and Written Opinion dated Apr. 25, 2014.
(Continued)

*Primary Examiner* — Joseph W Sanderson
(74) *Attorney, Agent, or Firm* — Kilpatrick Townsend & Stockton LLP; Dean W. Russell; Kristin M. Crall (57) ABSTRACT

Arrangements of at least one column of seats for passengers of a vehicle, the column including a next-front seat unit positioned in front of a next-back seat unit. Each seat unit includes a seat having a chair position and a bed position, and a bed extension coupled to the next-front seat unit. The bed extension has a stowed position within the next-front seat unit and a deployed position that is located within a space between the next-front seat unit and the next-back seat unit that is not occupied by the seat in the next-back seat unit when the seat in the next-back seat unit is positioned in the bed position.

12 Claims, 12 Drawing Sheets

(56) References Cited

U.S. PATENT DOCUMENTS

| | | | | |
|---|---|---|---|---|
| 8,419,123 | B2* | 4/2013 | Hankinson | B64D 11/06 297/118 |
| 8,616,643 | B2* | 12/2013 | Darbyshire | B64D 11/06 297/340 |
| 8,888,175 | B2* | 11/2014 | Dobrusin | B64D 11/06 244/118.6 |
| 9,022,320 | B2* | 5/2015 | Wallace | B64D 11/06 244/118.5 |
| 2006/0086864 | A1 | 4/2006 | Beroth | |
| 2006/0219843 | A1* | 10/2006 | Martin | B60N 2/34 244/118.6 |
| 2009/0146006 | A1* | 6/2009 | Park | B60N 2/345 244/118.6 |
| 2009/0302158 | A1* | 12/2009 | Darbyshire | B64D 11/06 244/118.6 |
| 2011/0156450 | A1 | 6/2011 | Collins et al. | |
| 2012/0104165 | A1* | 5/2012 | Dobrusin | B64D 11/06 244/118.6 |
| 2013/0241247 | A1* | 9/2013 | Wallace | B64D 11/06 297/118 |

OTHER PUBLICATIONS

International Patent Application No. PCT/IB2014/058507, International Preliminary Report on Patentability dated Aug. 6, 2015.

* cited by examiner

BED EXTENSION

CROSS REFERENCE TO RELATED APPLICATIONS

This application is related to and claims priority benefits from U.S. Provisional Application Ser. No. 61/755,542 ("the '542 application"), filed on Jan. 23, 2013, entitled BED EXTENSION. The '542 application is hereby incorporated in its entirety by this reference.

FIELD OF THE INVENTION

The field of the invention relates passenger seats within cabins of aircraft or other passenger vehicles and, more particularly, to passenger seats with bed positions.

BACKGROUND

Common carriers, such as passenger airlines, bus lines, and train lines, often contain multiple seats in one or more cabins. Subject to their compliance with applicable safety regulations, seating arrangements may vary from carrier to carrier. Whereas passengers may prefer fewer seats per cabin to increase leg-room, privacy, or other factors associated with decreased seat density, common carrier operators may prefer greater seats per cabin to increase revenue per transport. Optimizing, or at least enhancing, both passenger comfort and revenue generation is a significant issue in cabin design and layout.

In the case of business class cabin design, various parameters, such as passenger comfort, bed and seat dimensions, living space, direct access to the aisle, and angle of the bed surface to the cabin floor are additional considerations that influence cabin seating arrangements. For example, for passenger comfort, it is desirable to achieve a horizontal bed surface when in transport or flight. In many cases, a horizontal bed surface is achieved via a foot well that is positioned in a back surface of the next-front passenger seat. Thus, when each passenger seat is positioned in a horizontal position, the passenger seat surface joins with the foot well to form a horizontal bed surface for the passenger.

To provide passengers with an enhanced feeling of privacy, each passenger seat may be partially surrounded by a privacy shell and/or a side monument, which allows the passenger to use the passenger seat in any position without interfering with other passenger seat. In many cases, the overall footprint of the passenger seat unit is larger than the seat in the horizontal position, leaving open space within the passenger seat unit that could otherwise be utilized for additional bed dimensions.

Existing designs have included bed extensions attached to the passenger seat itself, which are designed to extend into the open space to provide additional bed dimensions. However, due to the passenger seat configuration and dimensions, such designs are limited in the amount of space that can be covered with a bed extension that is attached to the passenger seat and stows/deploys from the passenger seat.

Thus, it is desirable to provide a design for a bed extension that fully utilizes the amount of open space available within the passenger seat unit when the passenger seat is in the horizontal position, which is not limited in dimension by the configuration of the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include an arrangement of at least one column of seats for passengers of a vehicle, the at least one column comprising a next-front seat unit positioned in front of a next-back seat unit, wherein each seat unit comprises a seat having a chair position and a bed position, and a bed extension coupled to the next-front seat unit, wherein the bed extension comprises a stowed position within the next-front seat unit and a deployed position that is located within a space between the next-front seat unit and the next-back seat unit that is not occupied by the seat in the next-back seat unit when the seat in the next-back seat unit is positioned in the bed position.

According to additional embodiments of the present invention, each seat unit may further comprise a side monument, and a foot well positioned within a back side of the side monument, wherein the foot well of the next-front seat unit is configured to vertically align with the seat in the next-back seat unit when the seat in the next-back seat unit is positioned in the bed position.

According to certain embodiments of the present invention, a method of converting a seat unit in an arrangement of at least one column of seats for passengers of a vehicle, the at least one column comprising a next-front seat unit positioned in front of a next-back seat unit, wherein each seat unit comprises a seat having a chair position and a bed position, and a bed extension coupled to the next-front seat unit, the method comprises transitioning the seat in the next-back seat unit into the bed position, and transitioning the bed extension from a stowed position within the next-front seat unit to a deployed position within a space between the next-front seat unit and the next-back seat unit that is not occupied by the seat in the next-back seat unit when the seat in the next-back seat unit is positioned in the bed position.

In certain embodiments, the next-front seat unit further comprises a privacy shell and the bed extension pivotally coupled to a back surface of the privacy shell, wherein the stowed position of the bed extension is proximate the back surface of the privacy shell.

In other embodiments, the next-front seat unit further comprises a vertical partition slidingly coupled to a recess in the privacy shell, and the bed extension coupled to the vertical partition.

The bed extension may be coupled to the vertical partition, wherein the coupling comprises a single rotation or a combination of translation and rotation, or may be slidingly coupled to a recess in the privacy shell. Furthermore, the stowed position of the bed extension may be a horizontal position of the bed extension within the recess in the privacy shell.

In certain embodiments of the method of converting a seat unit, transitioning the bed extension from the stowed position comprises pivoting the bed extension downward from the back surface of the privacy shell. In other embodiments of the method of converting a seat unit, transitioning the bed extension from the stowed position comprises sliding the vertical partition toward a back of the at least one column until at least the bed extension is clear of the recess, and pivoting the bed extension downward and away from the vertical partition. In yet other embodiments of the method of converting a seat unit, transitioning the bed extension from the stowed position comprises sliding the bed extension toward a back of the at least one column.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide passenger seats with bed extensions for cabins in common carriers. While the passenger seats are discussed for use with business class aircraft cabins, they are by no means so limited. Rather, embodiments of the seating arrangements may be used in cabins of any type or otherwise as desired.

According to certain embodiments of the present invention, as shown in FIGS. 1-9, a cabin 52 may include an arrangement 10 of at least one column 14 comprising a plurality of seat units 12. Furthermore, the seat units 12 within the column 14 may be oriented so that all seat units 12 are facing forward relative to the cabin 52, all seat units 12 are facing aft relative to the cabin 52, the seat units 12 are arranged in an alternating pattern of facing forward and aft relative to the cabin 52, or any other suitable configuration. For purposes of the application, the terms "next-front" and "next-back" refer locally to the relative location of the seat units 12 within the column 14, and does not refer to the orientation of the seat units 12 with respect to the overall cabin 52. In other words, the term "next-front seat unit" means that the seat unit 12 is located directly in front of another seat unit 12 within the column 14, and the term "next-back seat unit" means that the seat unit 12 is located directly behind another seat unit 12 within the column 14, but neither term is intended to refer to a more global orientation of the seat units 12 within the cabin 52.

Each seat unit 12 may comprise a seat 16 that is configured to convert from an upright or reclined chair position to a horizontal position, also commonly referred to as a bed position, as shown in FIGS. 1, 2, 3A, 3B, 4, 5B, 6, 7B, 8, and 9. The seat 16 may be partially surrounded by a privacy shell 18 and/or a side monument 20, which allows the passenger to use the seat 16 in any position without interfering with other seats.

In certain embodiments where the length of the seat 16 in the bed position is not long enough for a passenger to lie down in a horizontal position, a front edge 22 of each seat 16 in the bed position is configured to be positioned proximate a foot well 24 that is positioned within a back side 26 of the side monument 20. A lower surface 28 of the foot well 24 is configured to align with the seat 16 when the seat 16 is in the bed position, as shown in FIGS. 1, 2, 3A, 3B, 4, 5B, 6, 7B, 8, and 9. As a result, the combined seat 16 in the bed position and the foot well 24 provide a comfortable sleeping length for a passenger to lie down in a horizontal position.

In other embodiments, the length of the seat 16 in the bed position is long enough for a passenger to lie down in a horizontal position without the need to incorporate the foot well 24. For example, a back rest cushion 46, a seat bottom cushion 48, and a leg rest 50 of the seat 16 may be configured to provide a sufficiently long bed position for a passenger to lie down in a horizontal position. In these embodiments, the leg rest 50 may be linked to the next-front seat unit 12 so that the leg rest 50 deploys back to join with the seat bottom cushion 48 in the bed position. In other embodiments, the leg rest 50 may be split into a first portion that is coupled to the seat 16 (as shown in FIGS. 1, 2, 3A, 3B, 4, 5B, 6, 7B, 8, and 9) and a second portion that is coupled to the next-front seat unit 12 and deploys back to align with the front edge 22 of the first portion of the leg rest 50. In yet other embodiments, the entire leg rest 50 may be coupled to the seat 16, wherein the leg rest 50 may be configured in two parts, which are linked so that the parts fold together to facilitate stowage when the seat 16 is in the chair position.

In the arrangement 10, a longitudinal axis 30 of each seat 16 is shifted with respect to a longitudinal axis 32 of the column 14, so that the longitudinal axis 30 of the seat 16 and the longitudinal axis 32 of the column 14 form an angle α.

As a result, because of the angled arrangement of the seats 16 within each seat unit 12 relative to the longitudinal axis 32 of the column 14, a space 36 between the seat 16 and the next-front privacy shell 18 is not occupied by the seat 16 when the seat 16 is converted to the bed position, as best illustrated in FIGS. 1, 2, 3A, and 7B. A bed extension 38 may be provided that is dimensioned to fit within the space 36 so that substantially all of the space 36 is converted to additional bed surface when the seat 16 is in the bed position, thus maximizing the bed dimensions as compared to the available space.

According to one exemplary embodiment of the arrangement 10, passengers seated in the seats 16 have their feet oriented away from an aisle 34 that is adjacent to those seats 16, further providing a sense of privacy for passengers. The entire arrangement 10 therefore exhibits a reverse herringbone pattern (or an upside down "W" when viewed from the front end of the cabin 52). However, this is but one exemplary embodiment of such a seating arrangement 10. A person of ordinary skill in the relevant art will understand that the arrangement 10 may include any configuration in which the seat 16 in the bed position is oriented at an angle relative to the longitudinal axis 32 of the column 14, including but not limited to orientations in which passengers seated in the seats 16 have their feet oriented toward the aisle 34 and the upper body oriented away from the aisle 34.

In certain embodiments, the bed extension 38 is not directly linked to the seat 16 (as this could limit the overall dimensions of the bed extension 38). Rather, the bed extension 38 is coupled to the privacy shell 18 or the side monument 20 of the next-front seat unit 12.

Figure 1:
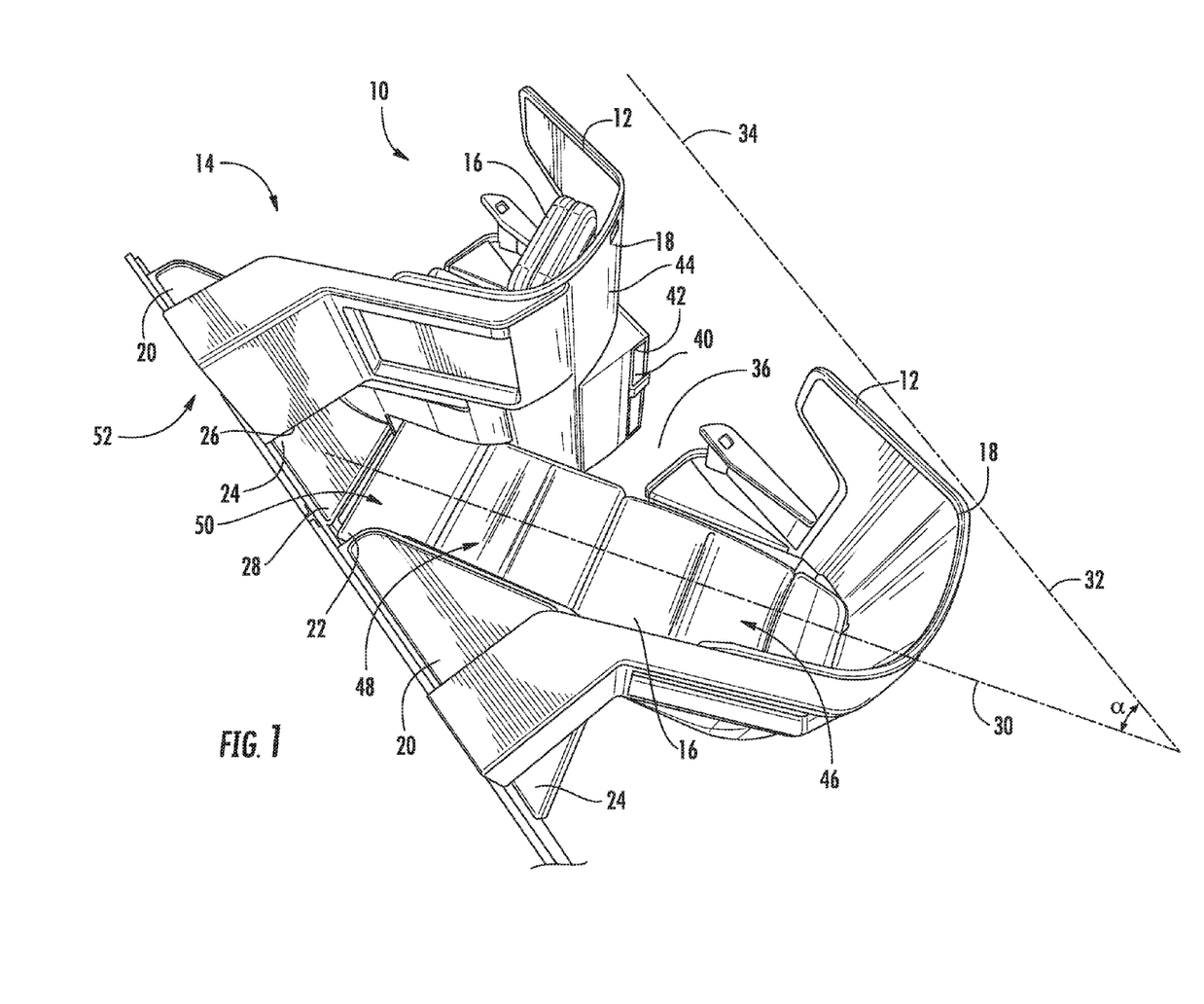
FIG. 1 is a top perspective view of a seat unit in a bed position with a bed extension and vertical partition in a stowed position, according to certain embodiments of the present invention.
Figure 2:
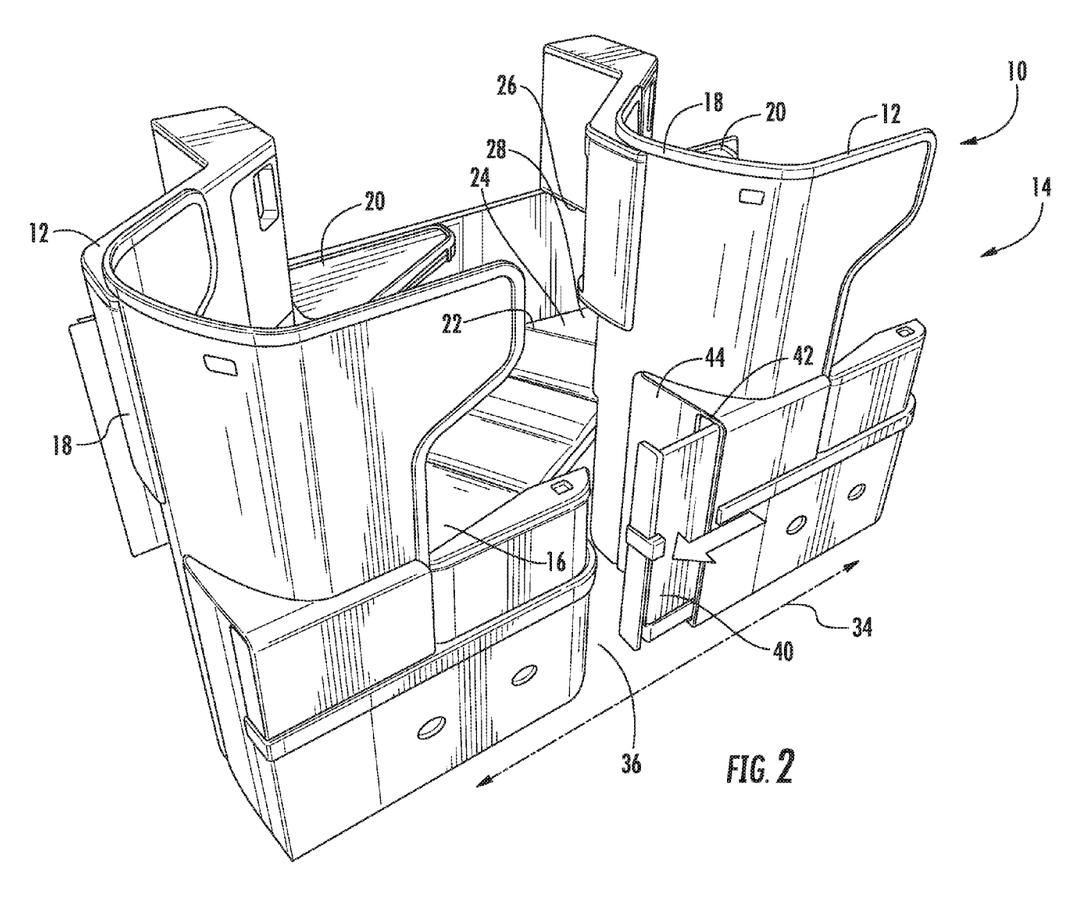
FIG. 2 is a side perspective view of the seat unit of FIG. 1 showing the partial deployment of the vertical partition from a recess in the next-front seat unit.
Figure 3A:
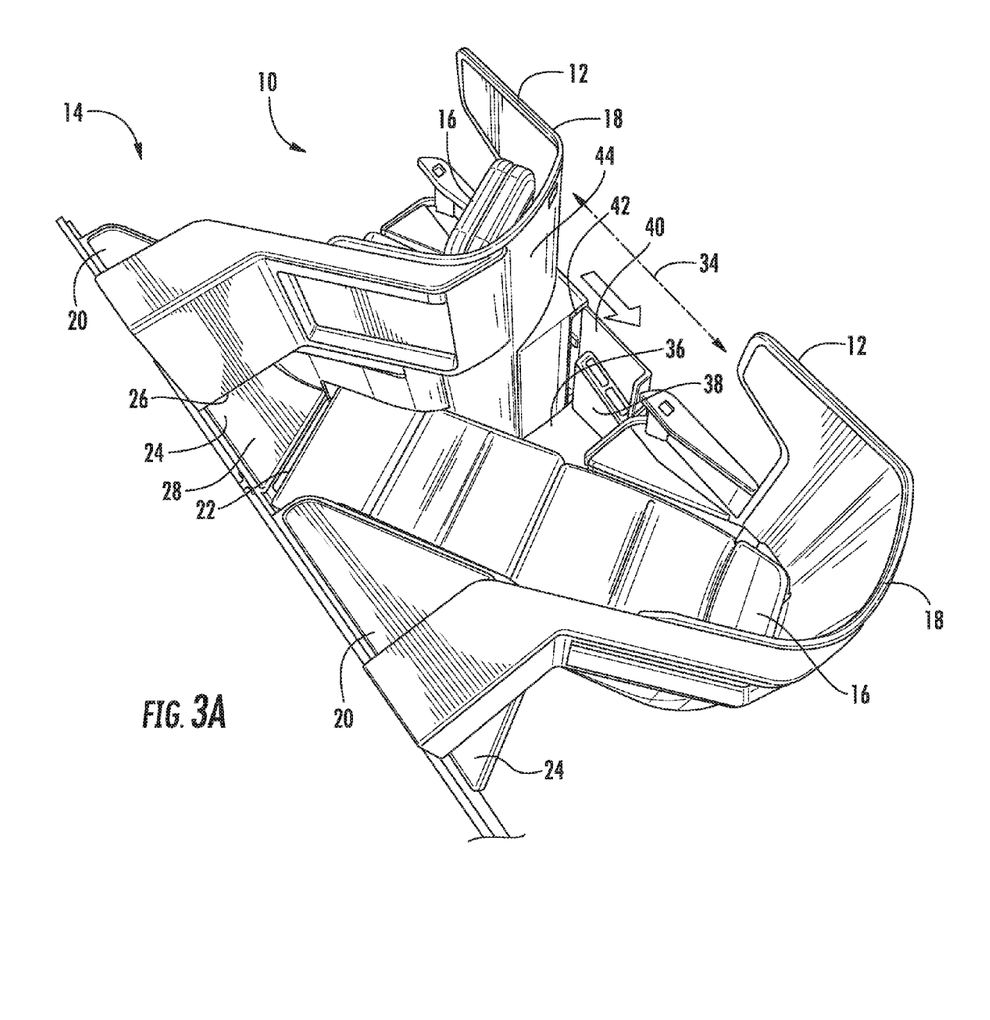
FIG. 3A is a top perspective view of the seat unit of FIG. 1 showing the vertical partition in a deployed position and the bed extension in a vertical position.
Figure 3B:
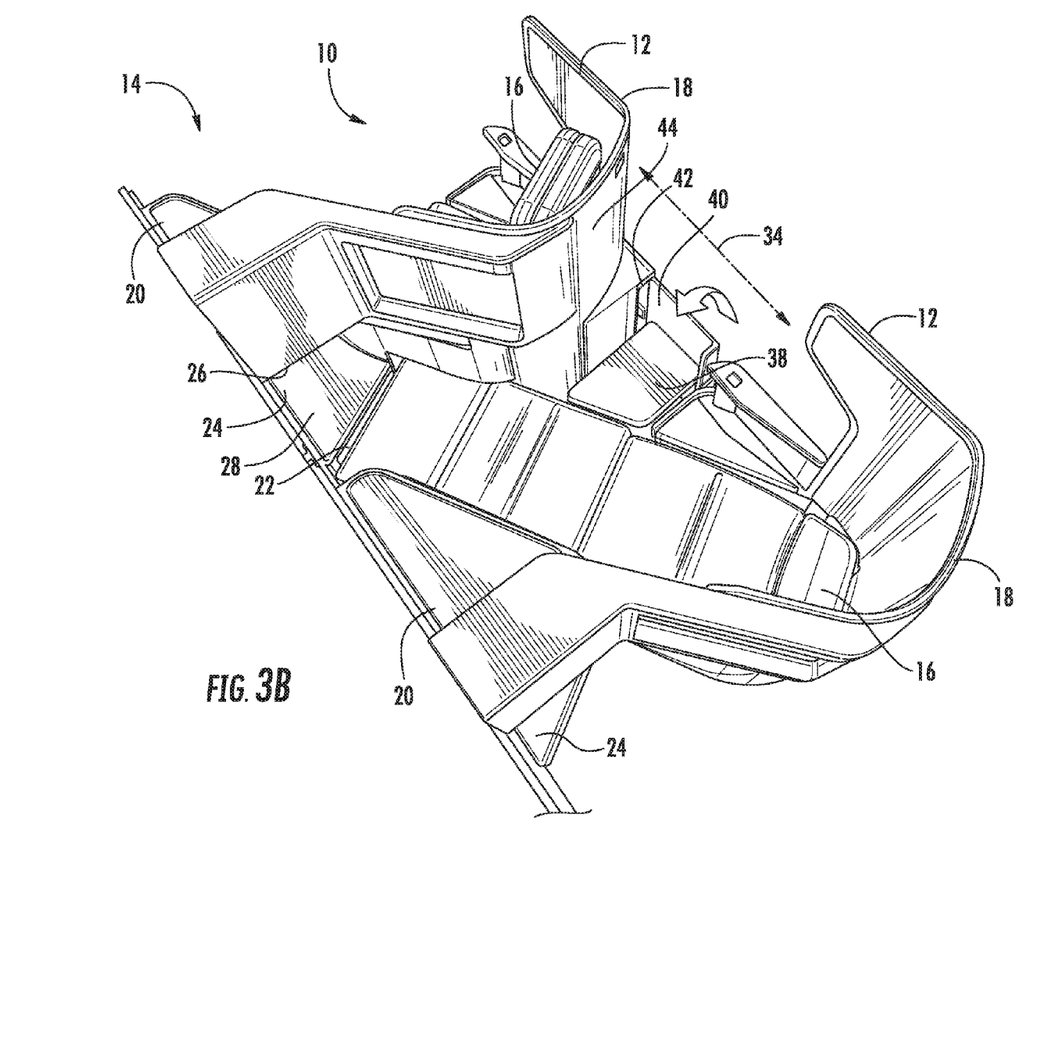
FIG. 3B is a top perspective view of the seat unit of FIG. 1 showing the bed extension being deployed.
Figure 4:
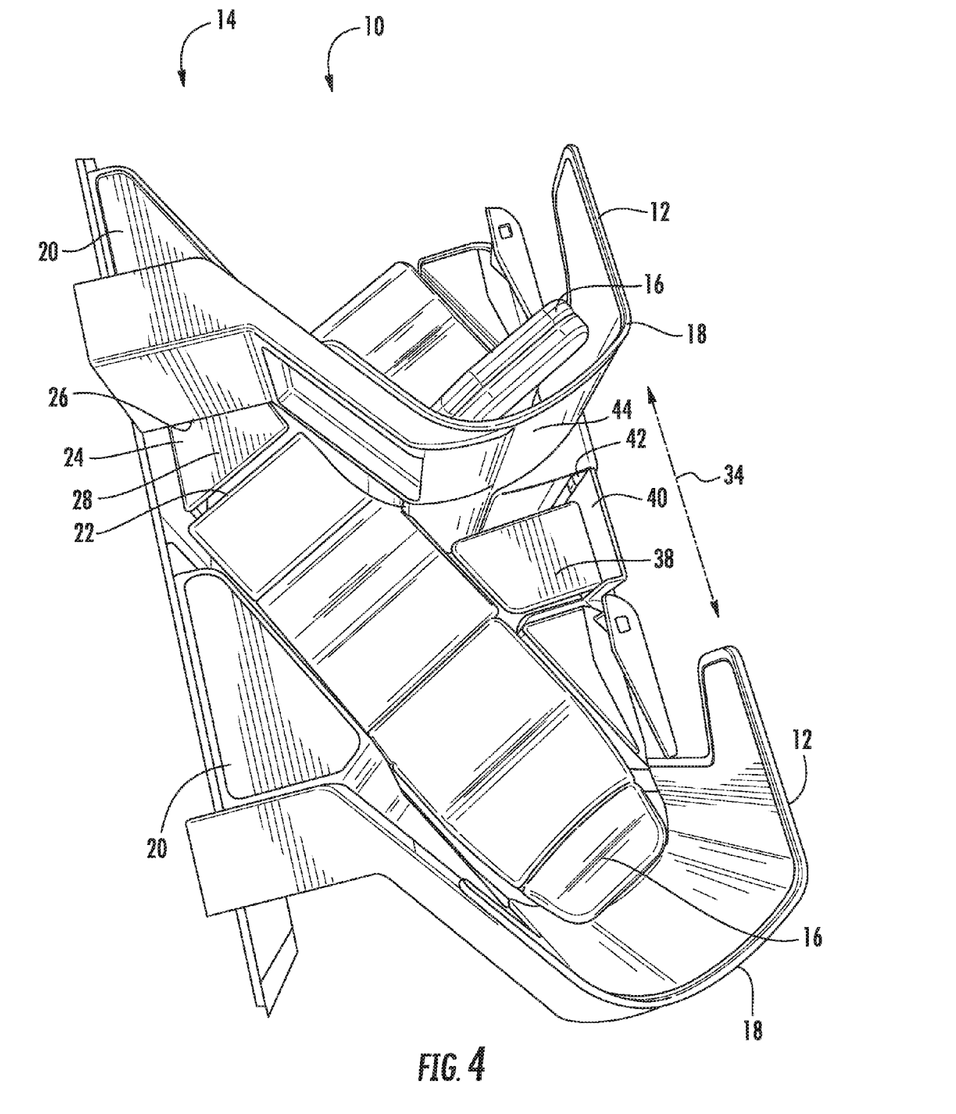
FIG. 4 is a top perspective view of the seat unit of FIG. 1 showing the seat unit in a bed position and the bed extension in a deployed position over the additional space in the seat unit.

In certain embodiments, as illustrated in FIGS. 1-4, the bed extension 38 is coupled to a vertical partition 40. Depending on the stowage position, the bed extension 38 may be simply pivotally coupled to the vertical partition 40 or coupled by a combination of pivoting and translation. The vertical partition 40 is slidingly coupled to a recess 42 in the privacy shell 18 of the next-front seat unit 12. To transition the bed extension 38 into a stowed position (as shown in FIG. 1), the bed extension 38 is pivoted upward into a vertical position proximate the vertical partition 40. The vertical partition 40 (with the vertically positioned bed extension 38) then slides toward the front of the column 14 into the recess 42. To transition the bed extension 38 into a deployed position (as shown in FIGS. 3B and 4), the vertical partition 40 (with the vertically positioned bed extension 38) slides toward the back of the column 14 until at least the bed extension 38 is clear of the recess 42, as illustrated in FIGS. 2 and 3A. As illustrated in FIG. 3B, the bed extension 38 then pivots downward and away from the vertical partition 40 into a substantially horizontal deployed position that is located within the space 36 and is dimensioned to substantially align with the dimensions of the space 36 when the seat 16 is in the bed position. As a result, substantially all (if not all) of the space 36 that is not occupied by the seat 16 in the bed position is converted to additional bed surface, so as to not leave any unused space within the seat unit 12 when the seat 16 is in the bed position.

Figure 5A:
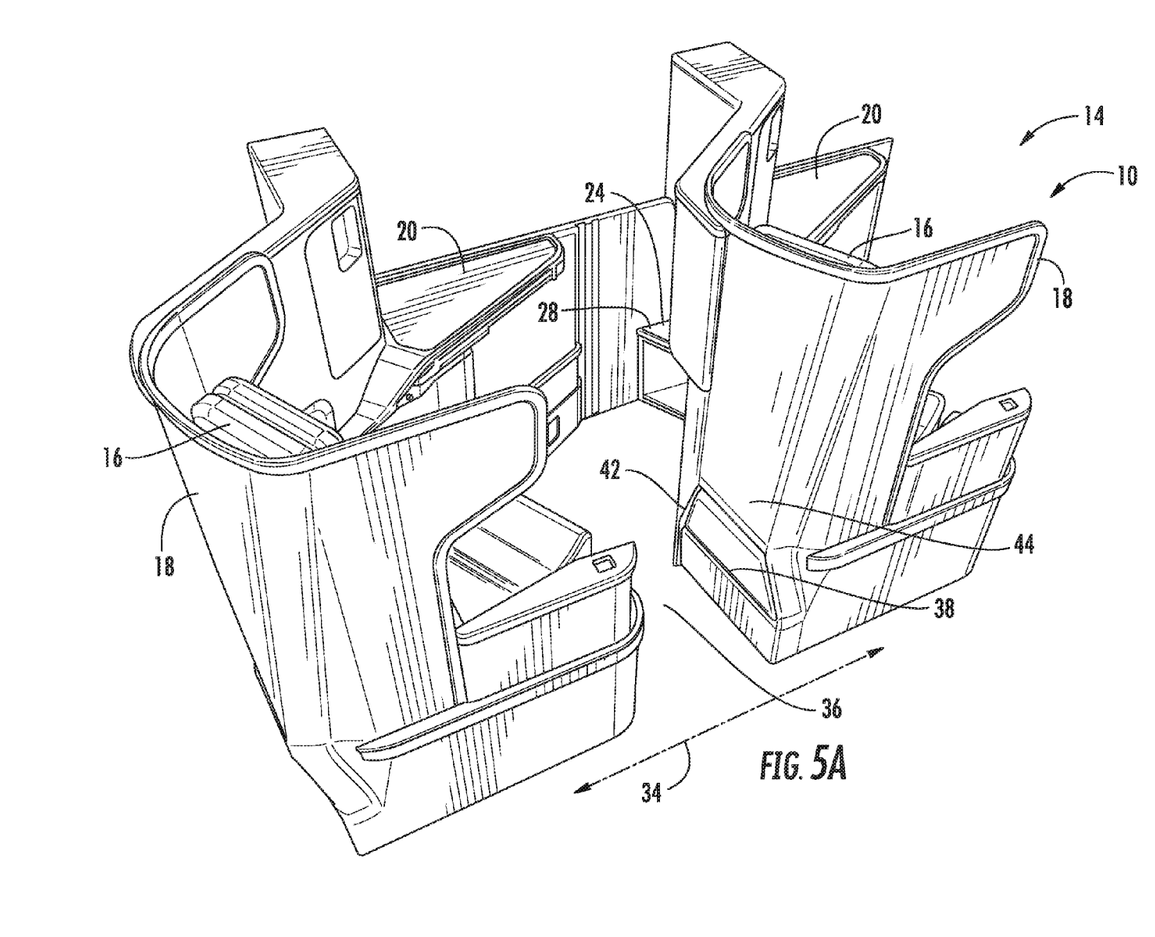
FIG. 5A is a top perspective view of a seat unit in an upright position with a bed extension in a stowed position, according to certain embodiments of the present invention.
Figure 5B:
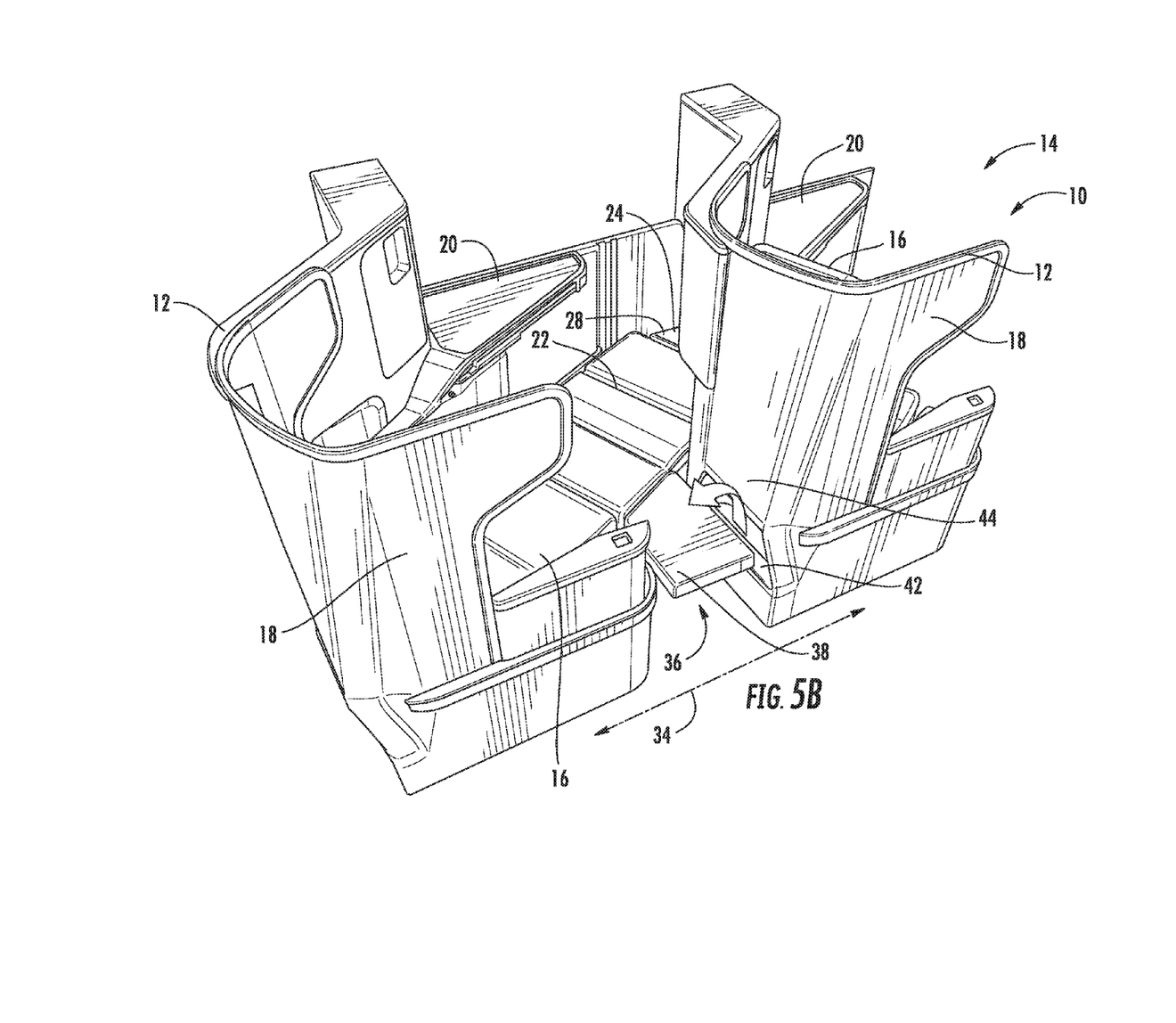
FIG. 5B is a top perspective view of the seat unit of FIG. 5A showing the seat unit in a bed position and the bed extension being deployed.
Figure 6:
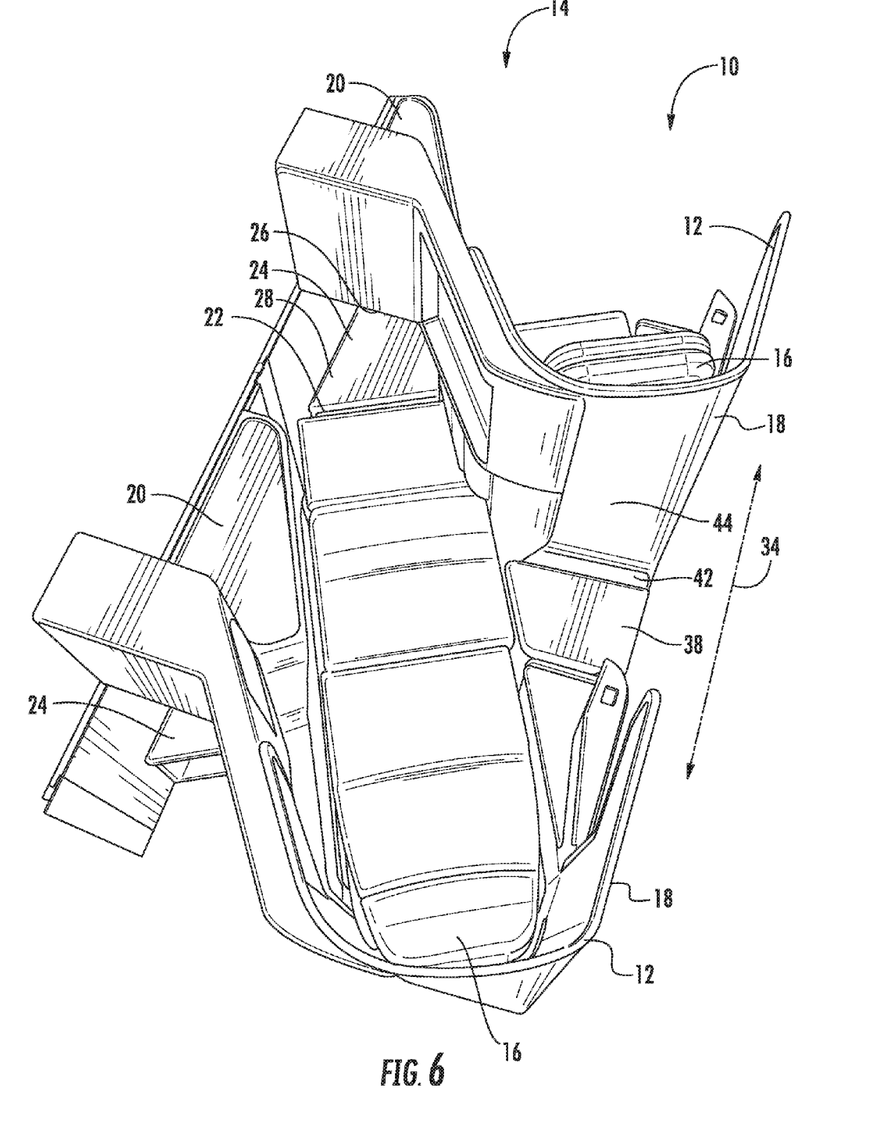
FIG. 6 is a top perspective view of the seat unit of FIG. 5A showing the seat unit in a bed position and the bed extension in a deployed position over the additional space in the seat unit.

In other embodiments, as illustrated in FIGS. 5A-6, the bed extension 38 is pivotally coupled to a back surface 44 of the next-forward privacy shell. To transition the bed extension 38 into a stowed position (as shown in FIG. 5A), the bed extension 38 is pivoted upward into a vertical position proximate the back surface 44 of the next-front privacy shell. To transition the bed extension 38 into a deployed position (as shown in FIGS. 5B and 6), the bed extension 38 pivots downward and away from the back surface 44 into a substantially horizontal deployed position that is located within the space 36 and is dimensioned to substantially align with the dimensions of the space 36 when the seat 16 is in the bed position. As a result, substantially all (if not all) of the space 36 that is not occupied by the seat 16 in the bed position is converted to additional bed surface, so as to not leave any unused space within the seat unit 12 when the seat 16 is in the bed position.

Figure 7A:
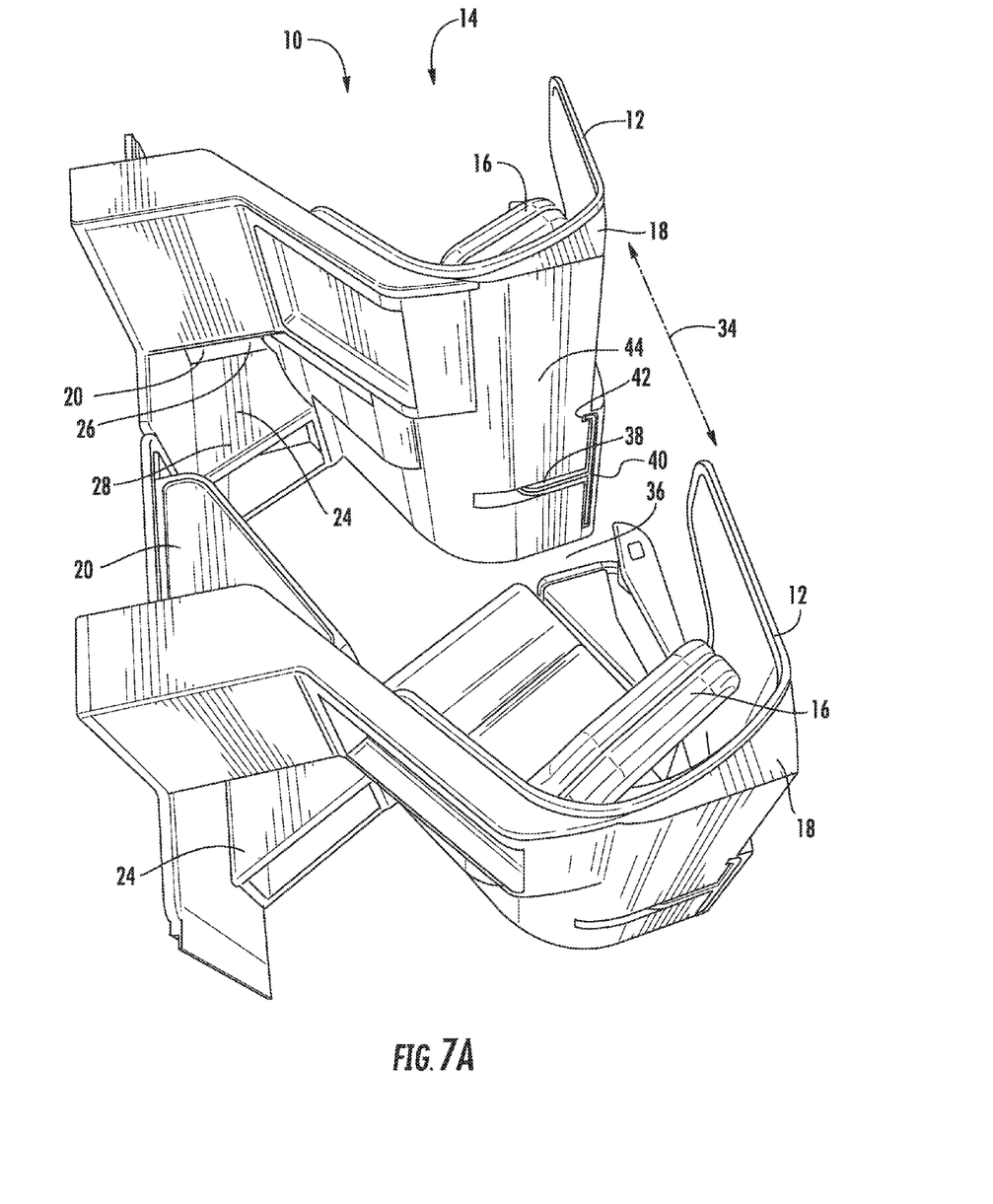
FIG. 7A is a top perspective view of a seat unit in an upright position with a bed extension and vertical partition in a stowed position, according to certain embodiments of the present invention.
Figure 7B:
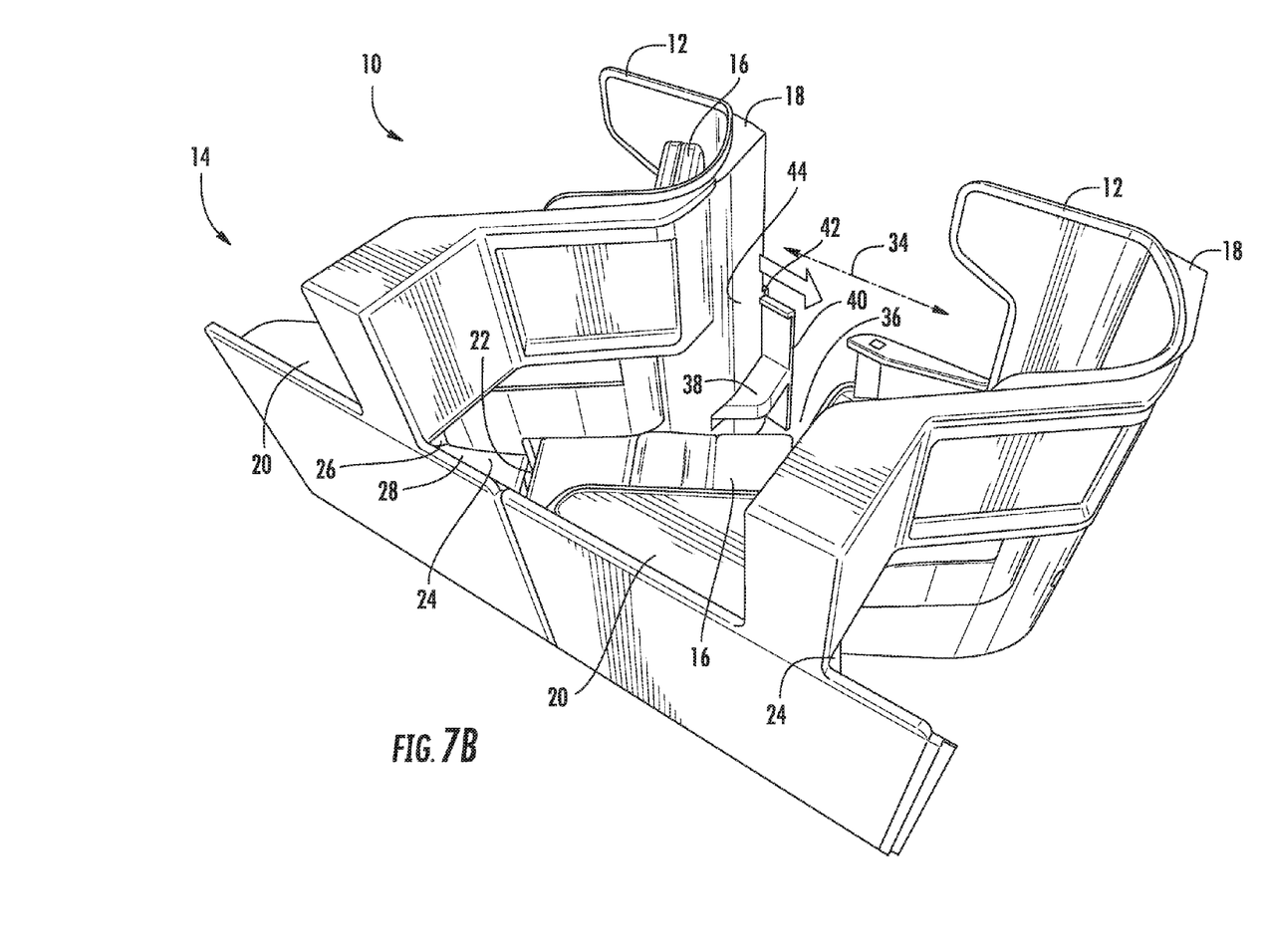
FIG. 7B is a top perspective view of the seat unit of FIG. 7A showing the partial deployment of the bed extension and the vertical partition from a recess in the next-front seat unit.
Figure 8:
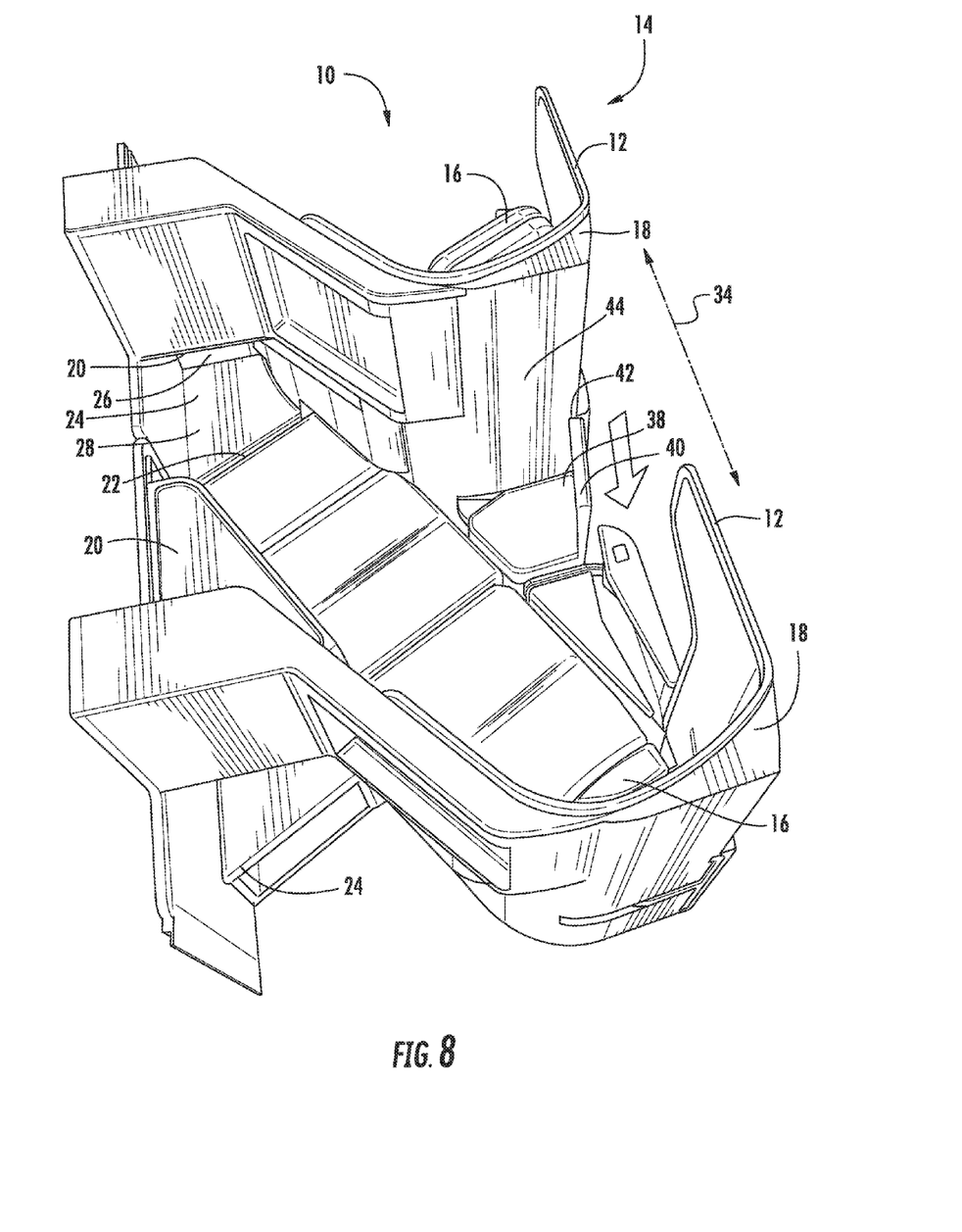
FIG. 8 is a top perspective view of the seat unit of FIG. 7A showing the seat unit in a bed position and the bed extension and vertical partition being deployed.
Figure 9:
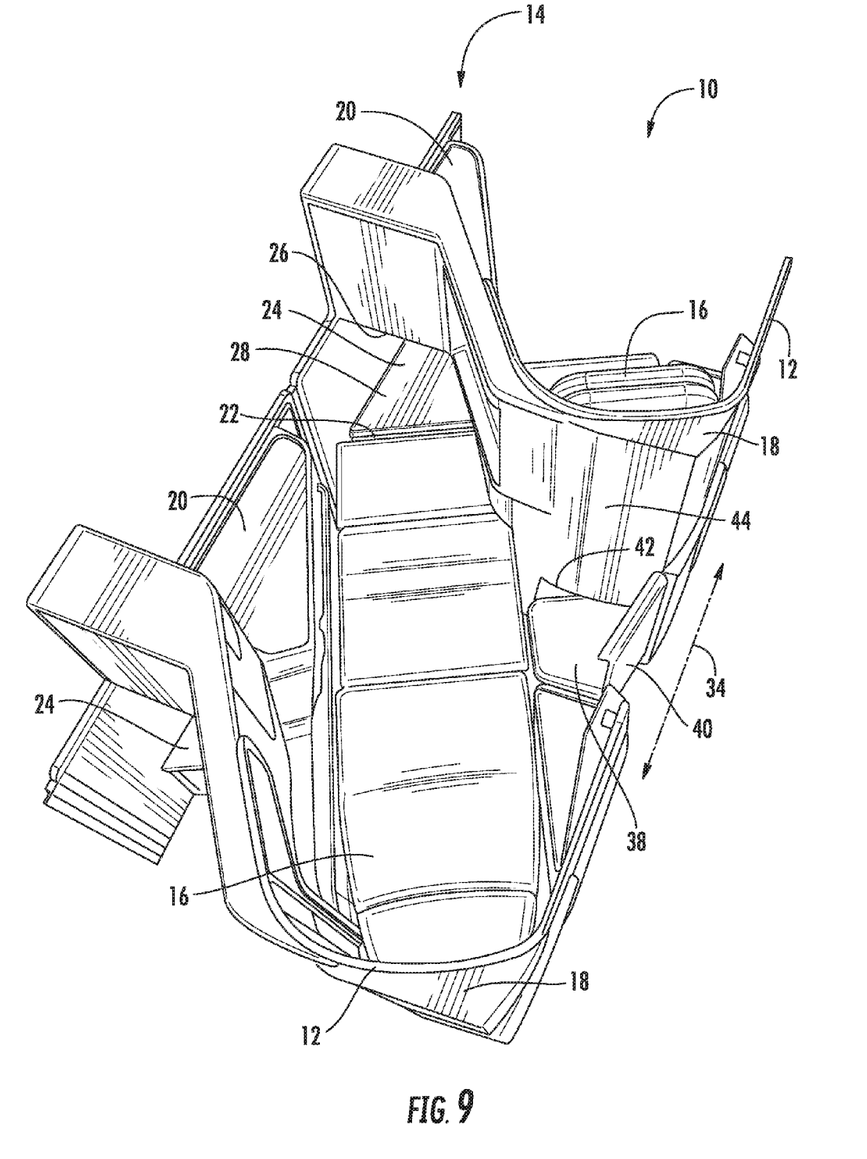
FIG. 9 is a top perspective view of the seat unit of FIG. 7A showing the seat unit in a bed position and the bed extension in a deployed position over the additional space in the seat unit.

In yet other embodiments, as illustrated in FIGS. 7A-9, the bed extension 38 may be fixedly coupled to the vertical partition 40 at a substantially perpendicular orientation to the surface of the vertical partition 40. The bed extension 38 and the vertical partition 40 are slidingly coupled to a recess 42 in the privacy shell 18 of the next-front seat unit 12. As best illustrated in FIG. 7A, the recess 42 is shaped to receive the bed extension 38 in a horizontal position and the vertical partition 40 in a vertical position. In other words, the recess 42 has a sideways "T" configuration. A person of ordinary skill in the art will understand that the vertical dimensions of the vertical partition 40 may vary anywhere from the full height of the privacy shell 18 to the thickness of the bed extension 38. In other words, when the vertical partition 40 has the height that aligns with the thickness of the bed extension 38, the "T" configuration collapses to a sliding horizontal system that effectively comprises the bed extension 38 alone without a vertical partition 40, and the recess 42 then has the shape of a horizontal slot configured to receive the thickness and length of the bed extension 38. To transition the bed extension 38 into a stowed position (as shown in FIG. 7A), the bed extension 38 and/or the vertical partition 40 slide toward the front of the column 14 into the recess 42. To transition the bed extension 38 into a deployed position (as shown in FIGS. 8 and 9), the bed extension 38 and/or the vertical partition 40 slide toward the back of the column 14 until the bed extension 38 is in a substantially horizontal deployed position that is located within the space 36 and is dimensioned to substantially align with the dimensions of the space 36 when the seat 16 is in the bed position, as shown in FIGS. 7B and 8. As a result, substantially all (if not all) of the space 36 that is not occupied by the seat 16 in the bed position is converted to additional bed surface, so as to not leave any unused space within the seat unit 12 when the seat 16 is in the bed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arrangement of at least one column of seats for passengers of a vehicle, the at least one column having a column longitudinal axis and comprising:

(a) a next-front seat unit positioned in front of a next-back seat unit, wherein each seat unit comprises a seat having a chair position and a bed position, a privacy shell, and a vertical partition received by and extendable from a recess in the privacy shell, each seat unit comprising a seat longitudinal axis that forms an angle with the column longitudinal axis; and (b) a bed extension for use with the next-back seat unit, the bed extension coupled to a mid-portion of the vertical partition of the next-front seat unit, wherein the bed extension comprises a stowed position within the recess of the privacy shell, wherein when deployed, (i) the vertical partition spans a side space between the next-front seat unit and the next-back seat unit and an upper portion of the vertical partition extends above the bed extension and provides a privacy wall and (ii) the bed extension is located within a space between the next-front seat unit and the next-back seat unit that is not occupied by the seat in the next-back seat unit when the seat in the next-back seat unit is positioned in the bed position, the bed extension comprising an angled face configured to abut a side of the seat of the next-back seat unit when the next-back seat unit is in the bed position.

2. The arrangement of claim 1, wherein a movement of the bed extension with respect to the vertical partition comprises a single rotation or a combination of translation and rotation.

3. The arrangement of claim 1, wherein the stowed position is a horizontal position of the bed extension within the recess in the privacy shell.

4. An arrangement of at least one column of seats for passengers of a vehicle, the at least one column comprising:

(a) a next-front seat unit positioned in front of a next-back seat unit, wherein each seat unit comprises a seat having a chair position and a bed position, a side monument, and a foot well positioned within a back side of the side monument, wherein the foot well of the next-front seat unit is configured to vertically align with the seat in the next-back seat unit when the seat in the next-back seat unit is positioned in the bed position; and (b) a bed extension for use with the next-back seat unit, the bed extension coupled to a mid portion of a vertical partition of the next-front seat unit, wherein an upper portion of the vertical partition forms a privacy wall when deployed, wherein the bed extension comprises a stowed position within a recess of the next-front seat unit and a deployed position that is located within a space between the next-front seat unit and the next-back seat unit that is not occupied by the seat in the next-back seat unit when the seat in the next-back seat unit is positioned in the bed position, wherein the bed extension comprises an angled face configured to abut a side of the seat of the next-back seat unit when in the bed position.

5. The arrangement of claim 4, wherein the next-front seat unit further comprises a privacy shell, and the vertical partition is slidingly coupled to a recess in the privacy shell.

6. The arrangement of claim 5, wherein a movement of the bed extension with respect to the vertical partition comprises a single rotation or a combination of translation and rotation.

7. The arrangement of claim 5, wherein the stowed position is a horizontal position of the bed extension within the recess in the privacy shell.

8. A method of converting a seat unit in an arrangement of at least one column of seats for passengers of a vehicle, the at least one column comprising a next-front seat unit positioned in front of a next-back seat unit, wherein each seat unit comprises a seat having a chair position and a bed position, and a bed extension for use with the next-back seat unit, the bed extension coupled to a mid-portion of a vertical partition of the next-front seat unit, the vertical partition sized to span a side space between the next-front seat unit and the next-back seat unit when deployed, an upper portion of the vertical partition extending above the bed extension and creating a privacy wall, the method comprising:

(a) transitioning the seat in the next-back seat unit into the bed position; and (b) transitioning the bed extension from a stowed position within the next-front seat unit to a deployed position within a space between the next-front seat unit and the next-back seat unit that is not occupied by the seat in the next-back seat unit when the seat in the next-back seat unit is positioned in the bed position by moving the vertical partition.

9. The method of claim 8, wherein the next-front seat unit further comprises a privacy shell, and the vertical partition is slidingly coupled to a recess in the privacy shell.

10. The method of claim 9, wherein a movement of the bed extension with respect to the vertical partition comprises a single rotation or a combination of translation and rotation.

11. The method of claim 10, wherein transitioning the bed extension from the stowed position comprises sliding the vertical partition toward a back of the at least one column until at least the bed extension is clear of the recess, and pivoting the bed extension downward and away from the vertical partition.

12. The method of claim 8, wherein transitioning the bed extension from the stowed position comprises sliding the bed extension toward a back of the at least one column.

* * * * *